(12) United States Patent
Chu (10) Patent No.: US 6,883,817 B2
(45) Date of Patent: Apr. 26, 2005

(54) FOLDING BICYCLE STRUCTURE

(75) Inventor: Kuo Yi Chu, Chu Pei (TW)

(73) Assignee: Arthur Chu, Hsinchu (TW)

( * ) Notice: Subject to any disclaimer, the term of this patent is extended or adjusted under 35 U.S.C. 154(b) by 0 days.

(21) Appl. No.: 10/638,350

(22) Filed: Aug. 12, 2003

(65) Prior Publication Data

US 2005/0035570 A1   Feb. 17, 2005

(51) Int. Cl.[7] .............................................. B62K 1/00
(52) U.S. Cl. ...................................... 280/278; 280/287
(58) Field of Search ............................ 280/278, 287; 16/429, 421; 74/551.1, 551.3, 551.7; 403/102, 403/109.1, 109.5, 374.1, 379.6

(56) References Cited

U.S. PATENT DOCUMENTS

| | | | |
|---|---|---|---|
| 3,623,749 A * | 11/1971 | Jensen | 280/278 |
| 4,202,561 A * | 5/1980 | Yonkers | 280/278 |
| 4,460,191 A * | 7/1984 | Ishibashi et al. | 280/287 |
| 4,688,817 A * | 8/1987 | Marier | 280/278 |
| 5,947,500 A * | 9/1999 | McGrane | 280/287 |
| 6,301,749 B1 * | 10/2001 | Chen | 16/429 |
| 6,595,539 B1 * | 7/2003 | Belli | 280/287 |
| 2001/0004150 A1 * | 6/2001 | Murayama | 280/287 |

* cited by examiner

Primary Examiner—Daniel G. DePumpo
(74) Attorney, Agent, or Firm—Rosenberg, Klein & Lee (57) ABSTRACT

A folding bicycle comprises a retractable front tube set. Handles at two sides of the top of the front tube set can be folded to the same side. An eccentric rotation device is pivotally provided at the top of the front tube set to drive an internal tube to retract in an outer tube for positioning. A seat tube is pivotally connected with the front tube set. A saddle is provided at the top of the seat tube. A rear tube is pivotally connected with the seat tube. A fastening device is provided between the rear tube and the seat tube to fix the seat tube. The front tube set, the seat tube and the rear tube are connected together by a joint link, which provides the function of a joint to let the front tube set, the seat tube and the rear tube unfold or fold with one another.

7 Claims, 9 Drawing Sheets

FOLDING BICYCLE STRUCTURE

FIELD OF THE INVENTION

The present invention relates to an improved bicycle structure and, more particularly, to an improved folding bicycle structure, which can be conveniently taken along and used.

BACKGROUND OF THE INVENTION

Nowadays, one usually goes to work, gets off duty, goes out to handle business or travels by taking a bus or subway or driving a car himself. However, there exists a certain distance between home and station, parking lot and business office, and station and scenic spot. Usually, there is no transportation tool in this route, and it will take a long time to walk. Therefore, using a bicycle as a transportation tool becomes the optimum choice of many persons for the situation of a short-distance route without other transportation tools.

Although riding a bicycle as a transportation tool can save the above trouble, existent bicycles are bulky and inconvenient for portability. Besides, although there already are folding bicycle, it is usually hard and troublesome to fold them. Moreover, some folding bicycles are folded by detaching some components thereof, and it is necessary to assemble these components when the folding bicycles are to be used, hence causing much inconvenience in storage of these components and use of the bicycles.

Accordingly, the present invention aims to propose a folding bicycle, which can be conveniently folded and taken along to solve the above problems in the prior art.

SUMMARY OF THE INVENTION

The primary object of the present invention is to provide an improved folding bicycle structure, which can be unfolded, and each component thereof can be positioned without any assembly actions. Moreover, it is not necessary to detach any component when folding the bicycle. Therefore, both the folding and unfolding actions are fast to accomplish the advantage of convenient use.

Another object of the present invention is to provide a folding bicycle, wherein the lengths of the front tube and the seat tube thereof can be adjusted according to the shape and height of the user to accomplish the advantage of convenient adjustment. Moreover, the bicycle can be folded into a smallest size to accomplish the advantage of high portability.

Yet another object of the present invention is to provide a folding bicycle structure of high safety to effectively avoid hazards such as automatic folding occurred when the folding bicycle is in use.

According to the present invention, an improved folding bicycle structure comprises a retractable front tube set, which includes an outer tube having an inner tube therein. An action rod is provided in the inner tube. A pair of handles are provided at the top of the action rod. An eccentric rotation device is pivotally provided at the top of the action rod. The eccentric rotation device makes vertical eccentric motions to let the action rod drive the internal tube to retract in the outer tube for positioning. The distal end of a seat tube is pivotally connected with the front tube set. A saddle is provided at the top of the seat tube. The top of a rear tube is pivotally connected with the seat tube. A fastening device is provided between the rear tube and the seat tube. When the rear tube pivotally rotates with respect to the seat tube, the fastening device is used to fix the seat tube. A joint link is connected between the front tube set, the seat tube and the rear tube. The joint link provides the function of a joint to let the front tube set, the seat tube and the rear tube unfold or fold with one another.

The various objects and advantages of the present invention will be more readily understood from the following detailed description when read in conjunction with the appended drawing, in which:

BRIEF DESCRIPTION OF THE DRAWINGS

FIGS. 6A, 6A1 and FIGS. 6B, 6B1 are diagrams showing how the fastening device firmly fastens the seat tube of the present invention; and FIGS. 7A, 7A1 and FIGS. 7B, 7B1 are diagrams showing how the fastening device releases the seat tube of the present invention.

DETAILED DESCRIPTION OF THE PREFERRED EMBODIMENTS

Figure 1:
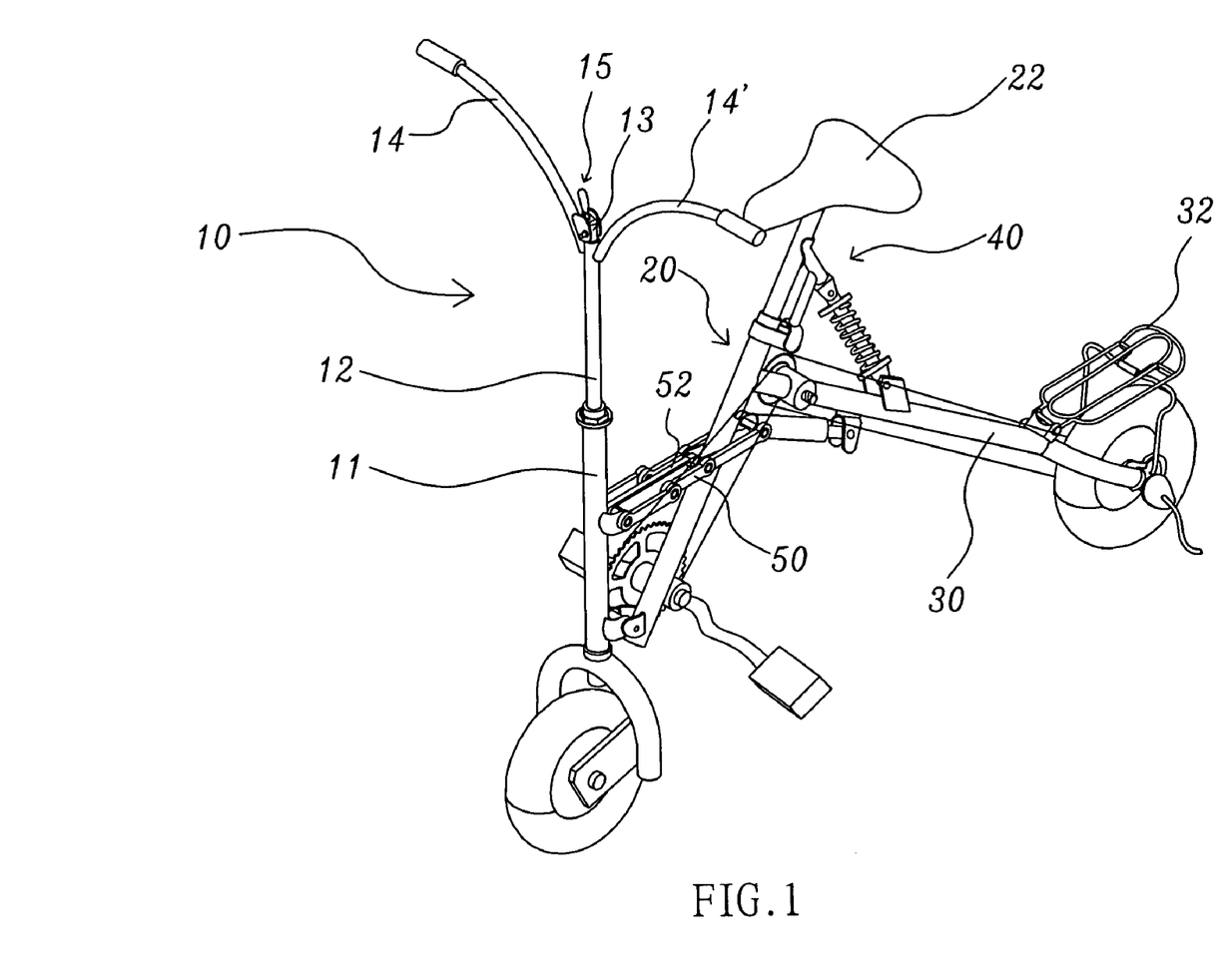
FIG. 1 is a perspective view of the structure of the present invention.

As shown in FIG. 1, a folding bicycle of the present invention comprises a retractable front tube set 10. The distal end of a retractable seat tube 20 is pivotally connected with the front tube set 10. A saddle 22 is provided at the top of the seat tube 20. The top of a rear tube 30 is pivotally connected with the seat tube 20. A fastening device 40 is provided between the rear tube 30 and the seat tube 20. When the rear tube 30 pivotally turns with respect to the seat tube 20 to unfold, the fastening device 40 will fix the seat tube 20. A rear rack 32 is pivotally provided at the tail portion of the rear tube 30. Please also refer to FIGS. 2 and 3. A joint link 50 is connected between the front tube set 10, the seat tube 20 and the rear tube 30, and provides the function of a joint to let the front tube set 10, the seat tube 20 and the rear tube 30 unfold or fold with one another.

Figure 2:
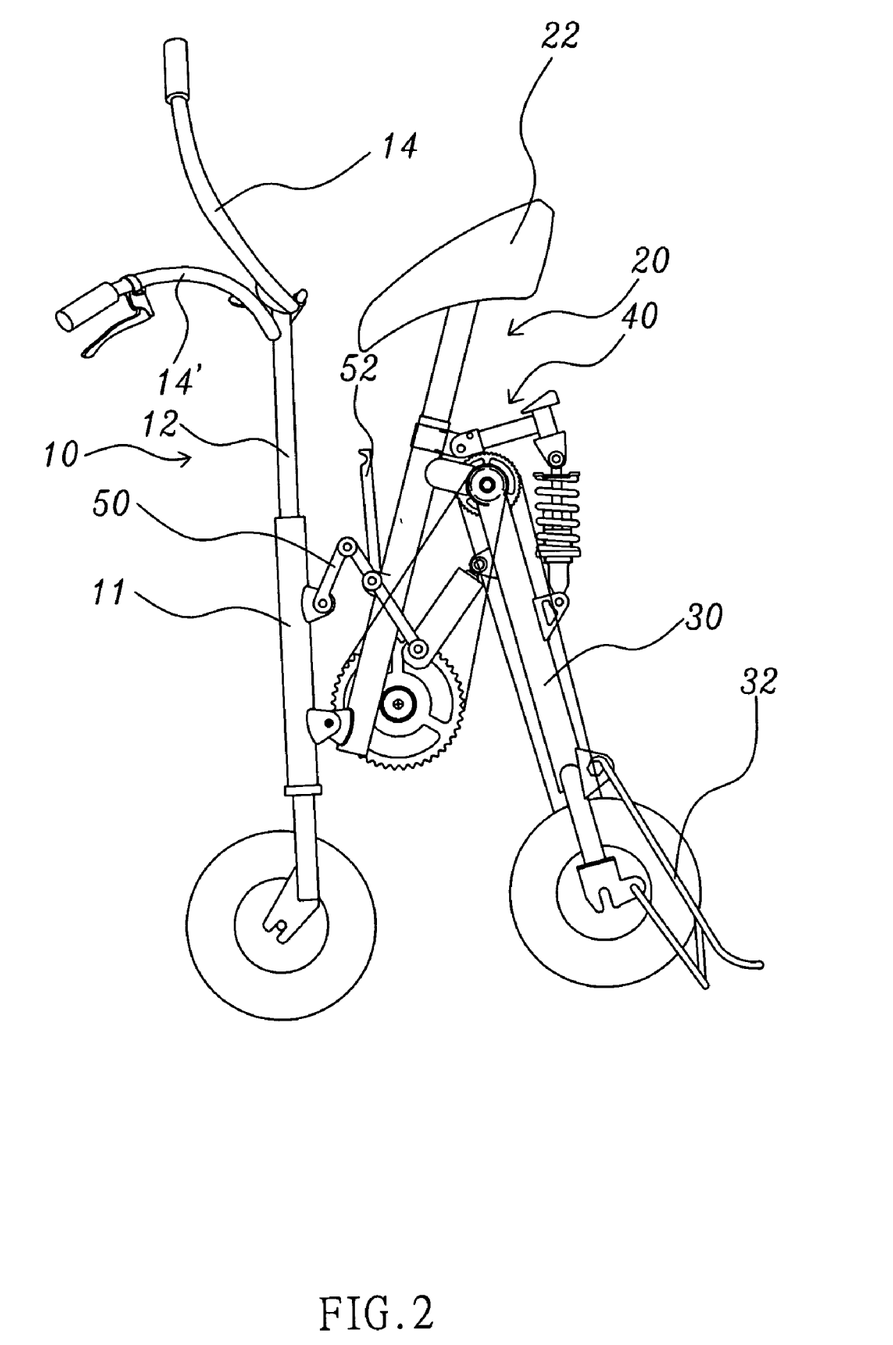
FIGS. 2 and 3 are diagrams showing the folding actions of the present invention.
Figure 3:
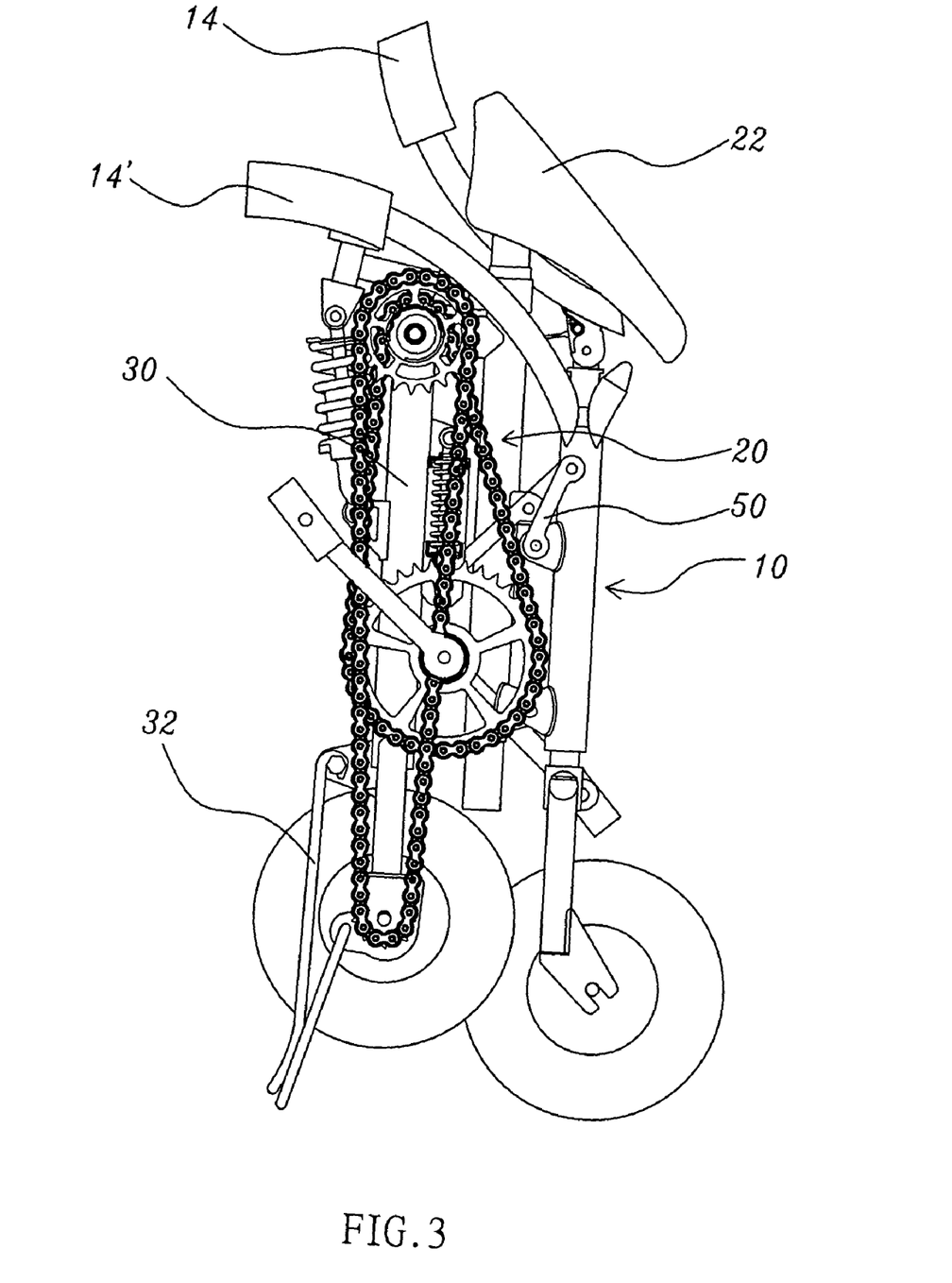

A fixing sheet 52 is provided on the joint link 50. When the joint link 50 unfolds, the fixing sheet 52 will fix the joint link 50 to limit its action, thereby securing the safety of the folding bicycle in use. Besides, when the folding bicycle unfolds, the rear rack 32 is pivotally turned to become horizontal for providing the function of carrying articles. After the folding bicycle is folded, the rear rack 32 is pivotally turned to become vertical for folding and letting the folding bicycle be erect on the ground.

Figures 4, 4A:
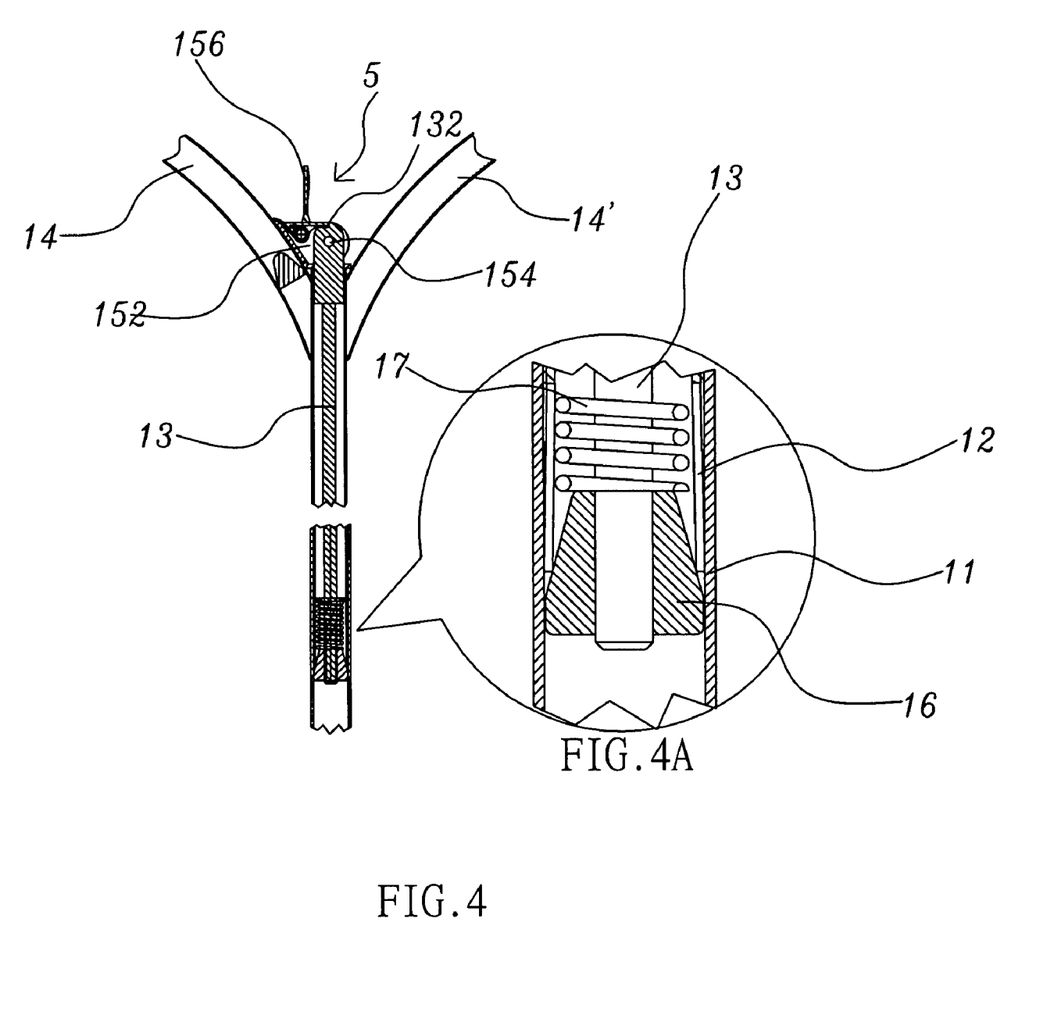
FIG. 4 and FIG. 4A are diagrams showing the use state of the front tube set of the present invention.

Please refer to FIGS. 4 and 4A. The retractable front tube set 10 includes an outer tube 11 having an inner tube 12 therein. An action rod 13 is provided in the inner tube 12. A recessed portion 132 is provided at the top of the action rod 13. A first handle 14 and a second handle 14' are provided at two sides of the top of the action rod 13. A coned piece 16 is embedded at the distal end of the action rod 13. The top of the coned piece 16 connects an elastic component 17, usually being a spring. The elastic component 17 is telescoped outside the action rod 13. An eccentric rotation device 15 is pivotally connected at the top of the action rod 13. The eccentric rotation device 15 comprises two action plates 152, and makes use of a pivot 154 to pass through eccentric positions of the two action plates 152 and the action rod 13 to pivotally connect them three together. The two action plates 152 are welded and fixed with the first handle 14. A positioning trigger 156 is arranged between the two action plates 152 and exactly straddles in the recessed portion 132 of the action rod 13 to limit the position of the first handle 14, thereby positioning the first handle 14 and letting it be immobile. Through pressing the positioning trigger 156, the first handle 14 can be turned toward the direction of the second handle 14' via rotation of the two action plates 152, thereby folding the two handles 14 and 14' together. When the first handle 14 is turned toward the second handle 14', it is also feasible that the eccentric rotation device 15 drives the action rod 13 to make horizontal rotation for adjusting the first handle 14 and the second handle 14' to be at adjacent positions at the same side so as to facilitate folding.

Figures 5, 5A:
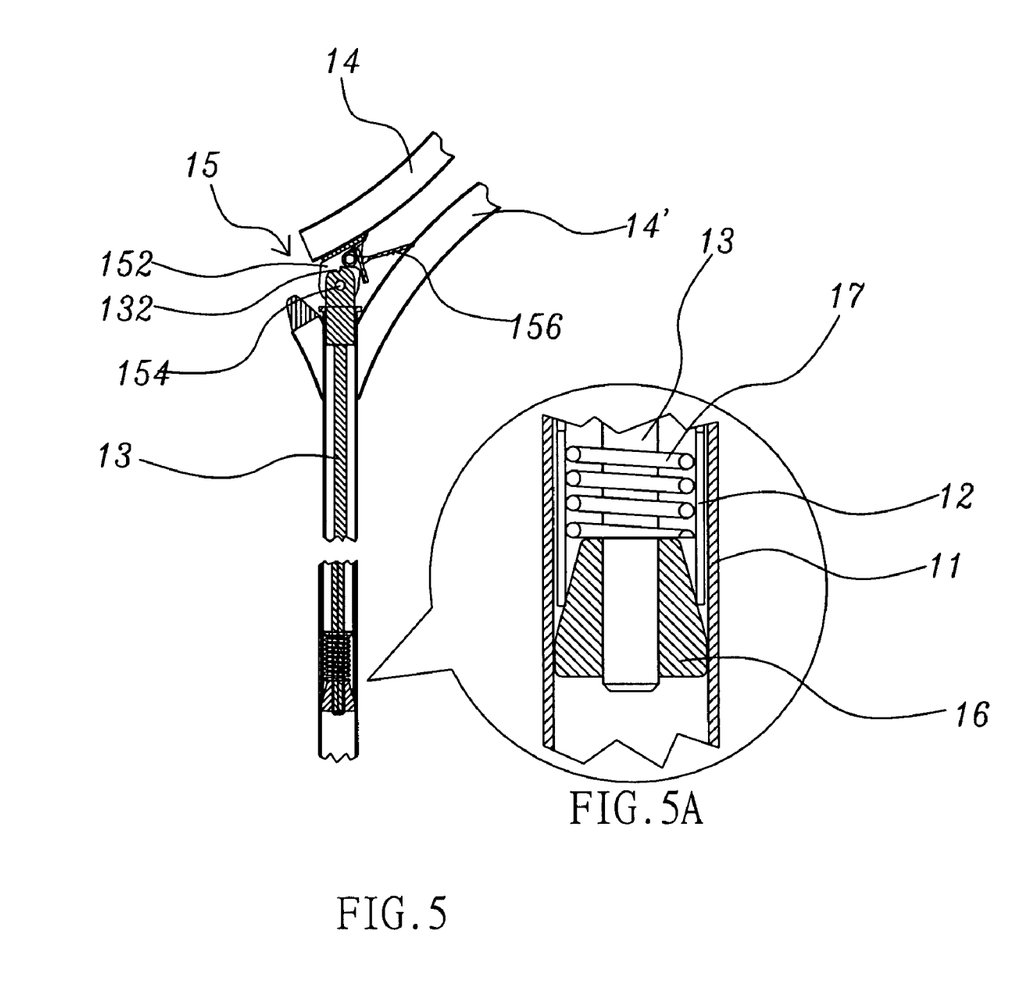
FIG. 5 and FIG. 5A are diagrams showing the folding state of the front tube set of the present invention.

When the first handle 14 is opposite to the second handle 14' and the positioning trigger 156 is locked in the recessed portion 132 of the action rod 13 for positioning, the first handle 14 is fixed at a positioning place, and the pivot 154 of the eccentric rotation device 15 is at a state slightly moving upwards to drive the action rod 13 to move upwards, hence letting the coned piece 16 move upwards to hold open the inner tube 12 outwards. The inner tube 12 will thus be subjected to an outward horizontal force to tightly contact the outer tube 11. The inner tube 12 can thus be positioned. On the other hand, when the eccentric rotation device 15 is used to let the first handle 14 be at the state shown in FIGS. 5 and 5A, because the pivot 154 slightly move downwards at this time to drive the action rod 13 to also slightly move downwards, hence letting the coned piece 16 move downwards and no longer hold open the inner tube 12. There thus will be a gap between the inner tube 12 and the outer tube 11 so that the inner tube 12 can move freely in the outer tube 11. At this state, the length of the front tube set 10 can be adjusted. Therefore, when the first handle 14 of the retractable front tube set 10 is at the folded state, the length of the front tube set 10 can be adjusted. Subsequently, the first handle 14 can move back to the positioning place through rotation of the eccentric rotation device 15 to accomplish the function of fixing the inner tube 12.

Figure 6A:
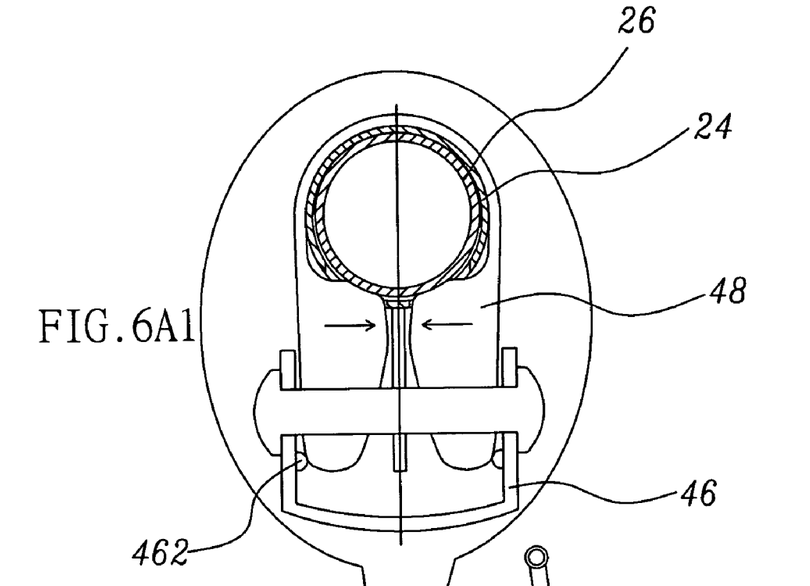
Figure 6A:
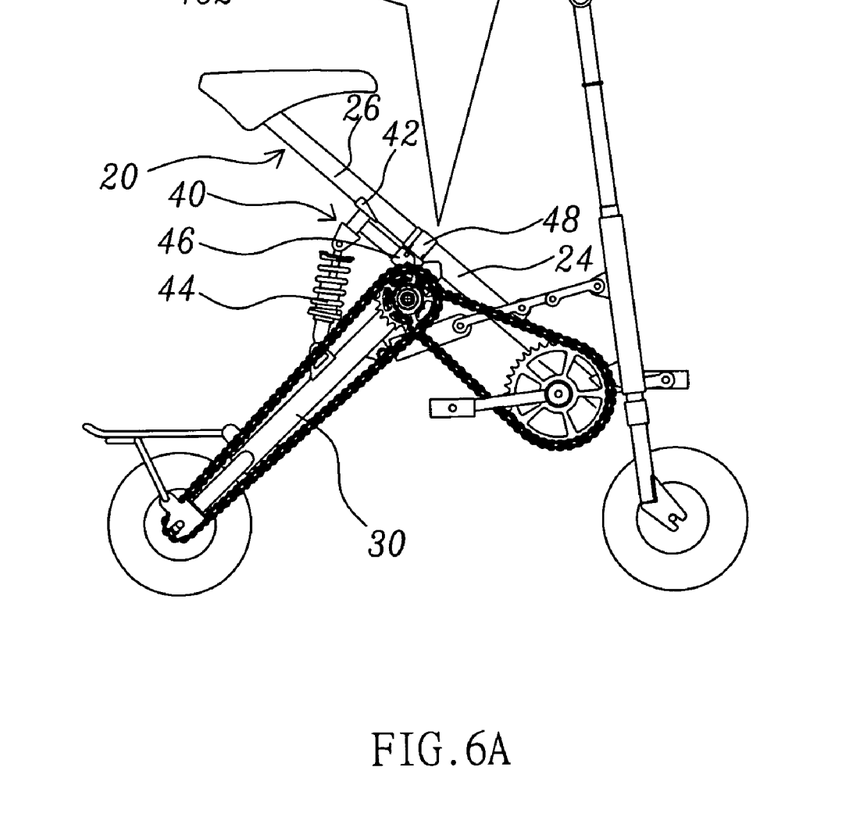
Figure 6B:
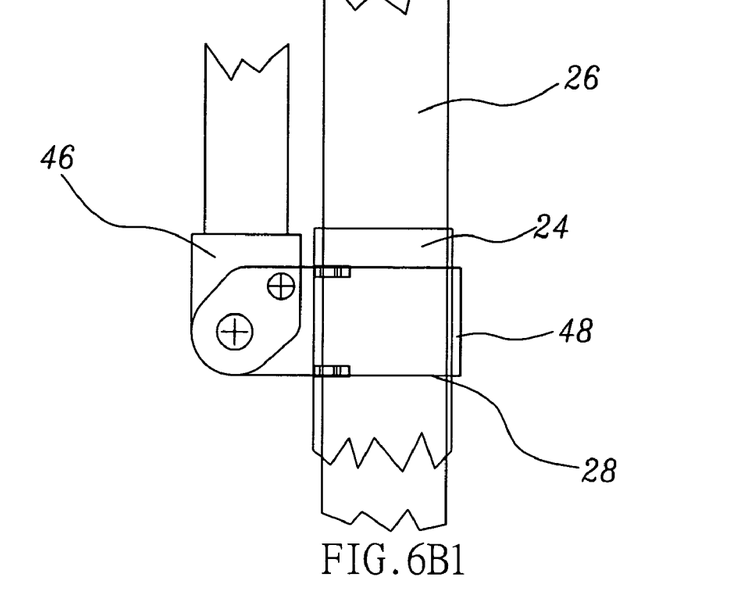
Figure 6B:
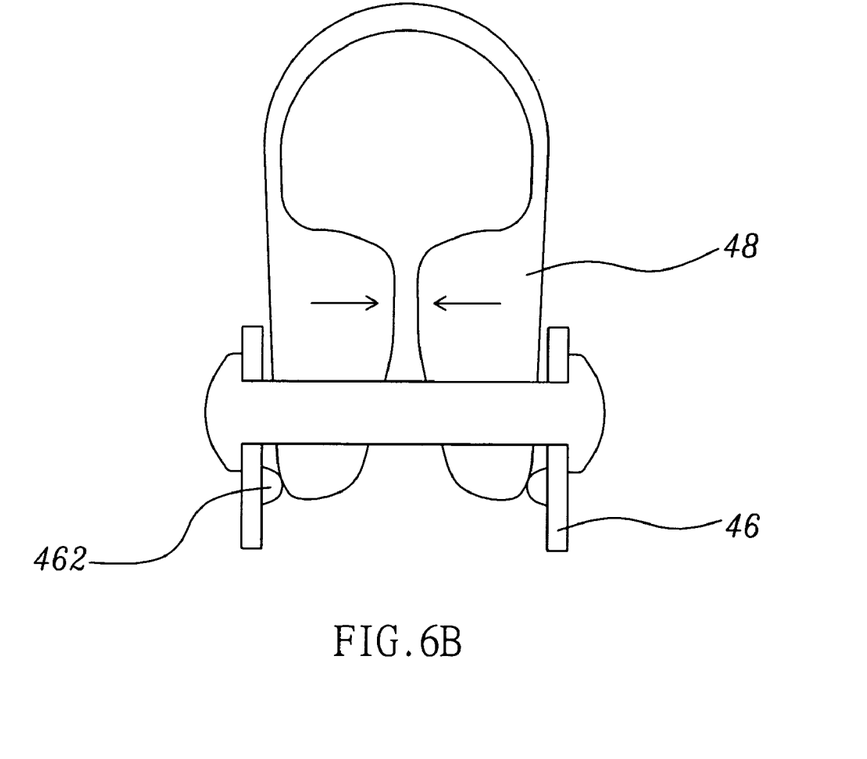

Please refer to FIGS. 6A, 6A1 and FIGS. 6B, 6B1 simultaneously. The retractable seat tube 20 is composed of an outer tube 24 and an inner tube 26. A discontinuous telescoping opening 28 is annularly provided at the side edge of the top of the outer tube 24. The fastening device 40 comprises a support arc piece 42, a U-shaped piece 46 and a U-shaped clamping body 48. The support arc piece 42 is connected to the rear tube 30 via a shock absorber 44. The U-shaped piece 46 is connected with the support arc piece 42. Two projective points 462 are provided at inner sides of two clamping arms of the U-shaped piece 46. The opening of the U-shaped clamping body 48 is opposite to the opening of the U-shaped piece 46. The U-shaped clamping body 48 is pivotally connected with the U-shaped piece 46. Two clamping arms of the U-shaped clamping body 48 is located inside the two clamping arms of the U-shaped piece 46. The U-shaped clamping body 48 passes through the outer tube 24 via the telescoping opening 28 of the seat tube 20 to be clamped outside the inner tube 26. When the rear tube 30 pivotally turns with respect to the seat tube 20 to unfold, the pivotal connection position of the fastening device 40 will be driven to pivotally turn, letting the support arc piece 42 contact and support the seat tube 20. The U-shaped piece 46 will also pivotally turn to let the two projective points 462 compress the two clamping arms of the U-shaped clamping body 48 to let the two clamping arms of the U-shaped clamping body 48 contract inwards and tightly clamp the inner tube 26 of the seat tube 20, thereby accomplishing the function of fixing the seat tube 20.

Figures 7A, 7A:
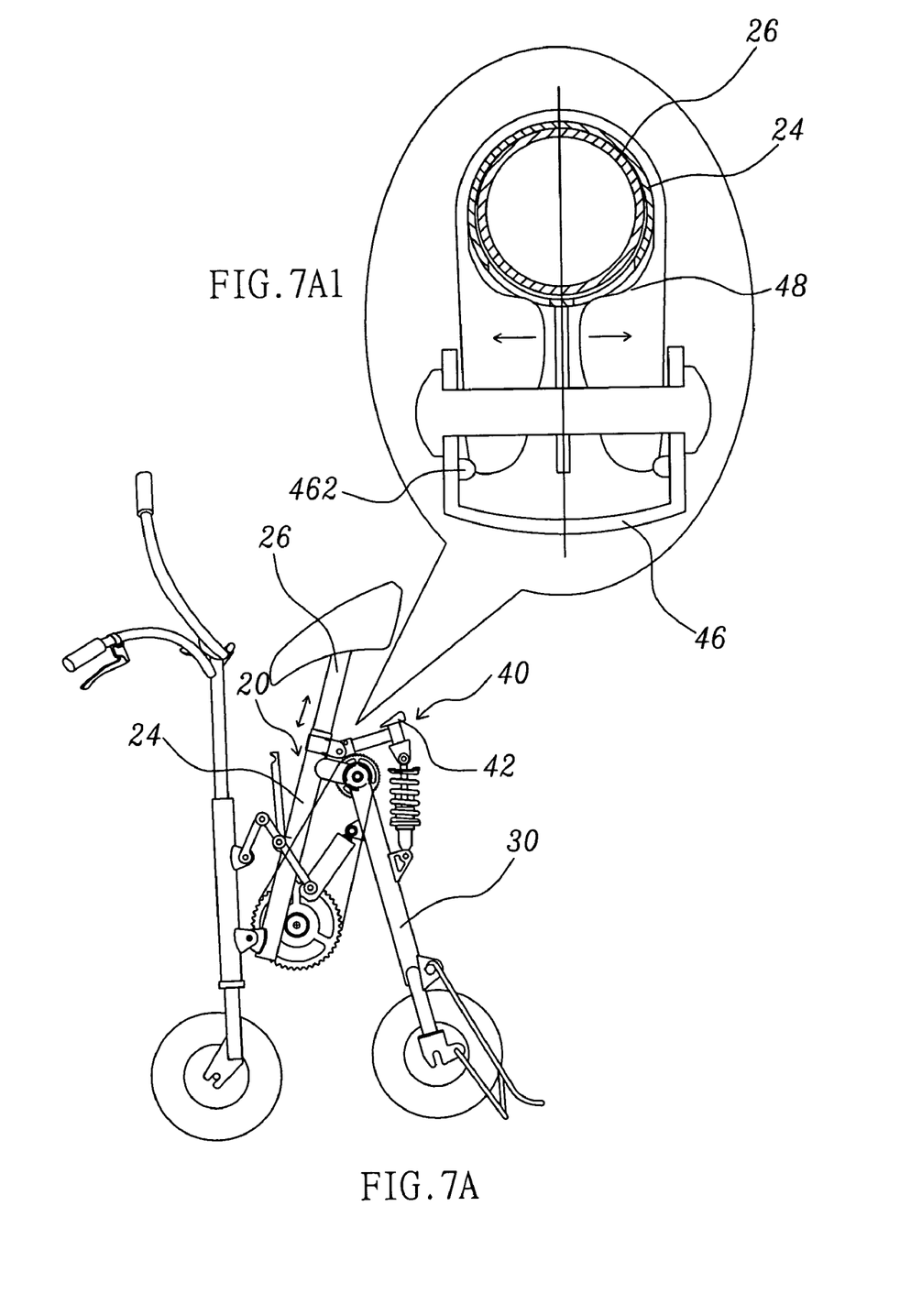
Figure 7B:
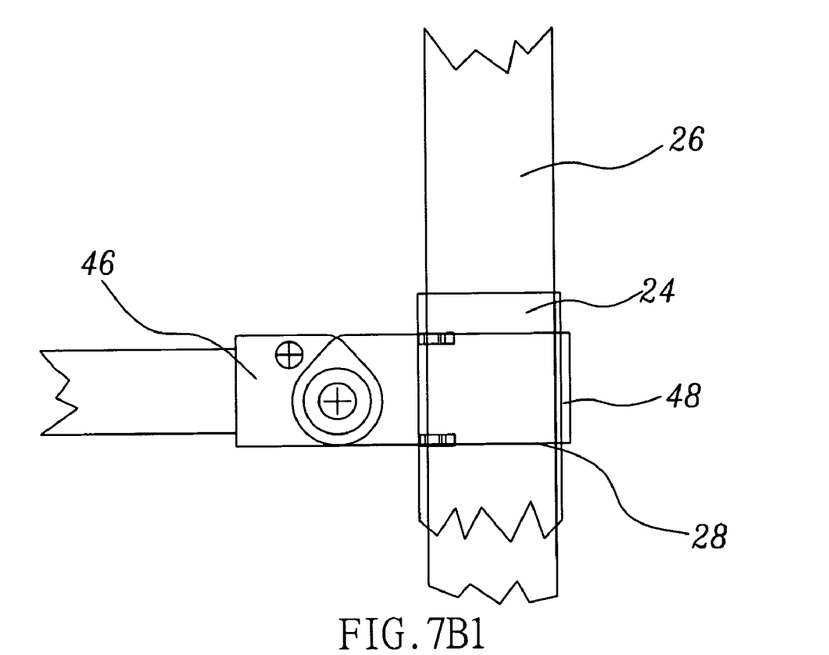
Figure 7B:
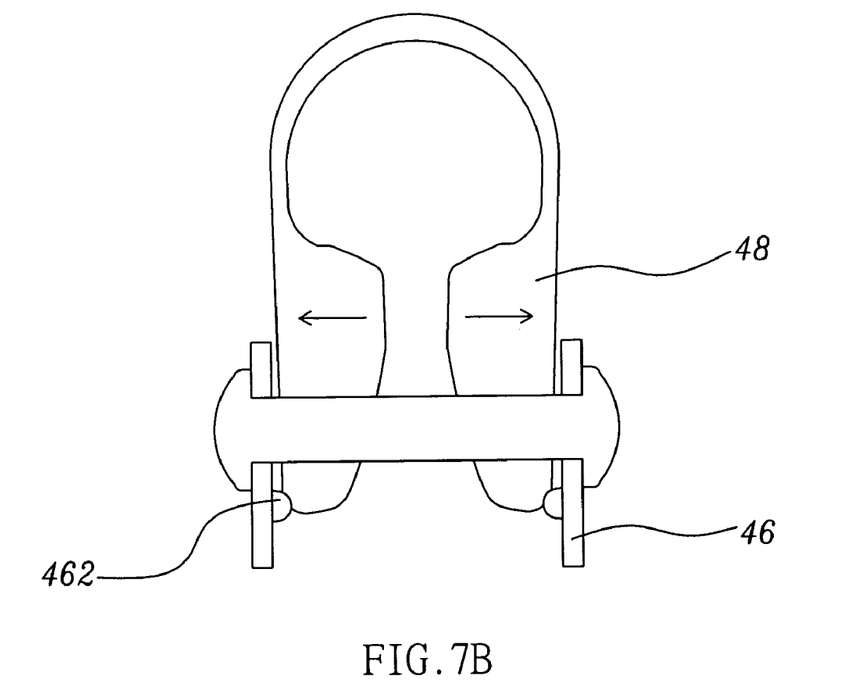

Contrarily, as shown in FIGS. 7A, 7A1 and FIGS. 7B, 7B1, when the folding bicycle is folded, the rear tube 30 is pivotally turned toward the direction of the seat tube 20 to drive the fastening device 40 to pivotally turn synchronously, letting the projective points 462 at the two sides of the U-shaped piece 46 move upwards and no longer compress the U-shaped clamping body 48. The compression force on the U-shaped clamping body 48 is thus released to let the two clamping arms spread to restore to the original state. Therefore, the inner tube 26 of the seat tube 20 will not be clamped, and can move freely in the outer tube 24. In other words, when the rear tube 30 and the seat tube 20 are folded, the length of the seat tube 20 is adjusted, and the rear tube 30 then pivotally turns with respect to the seat tube 20 to unfold, thereby driving the fastening device 40 to pivotally turn and the support arc piece 42 to support the seat tube 20. The projective points 462 at the two sides of the U-shaped piece 46 will compress the U-shaped clamping body 48 to let the U-shaped clamping body 48 tightly clamp the inner tube 26 of the seat tube 20, hence accomplishing the function of fixing the seat tube 20.

When the folding bicycle of the present invention is in use, as shown in FIGS. 1 to 3, it is only necessary to pull open and position the front tube set 10, the seat tube 20 and the rear tube 30 and then turn the first handle 14 to the positioning place opposite to the second handle 14', letting the bicycle become the shape shown in FIG. 1. The bicycle can be ridden without assembling any component. Simultaneously, the length of the front tube set 10 and the seat tube 20 can be adjusted according to the shape and height of the user. When the bicycle is not in use, it is only necessary to pull close the front tube set 10, the seat tube 20 and the rear tube 30 for folding and then turn the first handle 14 to the same side as the second handle 14' through the function of the eccentric rotation device 15. The inner tube 26 can thus be easily retracted to the lowest point. Because the seat tube 20 is not clamped by the fastening device 40, the seat tube 20 can also be easily retracted to the shortest state to fold the bicycle into the state with a smallest size, hence accomplishing the object of small size and convenient portability.

To sum up, the present invention provides a folding bicycle, which can be unfolded and each component thereof can be positioned without any assembly actions. Moreover, it is not necessary to detach any component when folding the bicycle. Therefore, both the folding and unfolding actions are fast, hence having the advantage of convenient use. Moreover, the lengths of the front tube and the seat tube can be adjusted according to the shape and height of the user, hence accomplishing the advantage of convenient adjustment. The bicycle can also be folded into a smallest size to accomplish the effect of convenient portability. Besides, the folding bicycle of the present invention has the advantage of high safety.

Although the present invention has been described with reference to the preferred embodiment thereof, it will be understood that the invention is not limited to the details thereof. Various substitutions and modifications have been suggested in the foregoing description, and other will occur to those of ordinary skill in the art. Therefore, all such substitutions and modifications are intended to be embraced within the scope of the invention as defined in the appended claims.

I claim:

1. An improved folding bicycle structure comprising:
a retractable front tube set including an outer tube having an inner tube therein, an action rod having a top and a bottom being provided in said inner tube;
a first handle being provided on a first side of said top of said action rod, and a second handle being provided at a second opposing side of said top of said action rod;
an eccentric rotation device being pivotally coupled and releasably engagable with said top of said action rod;
a coned piece being coupled adjacent at said bottom of said action rod, said action rod displaces said coned piece into said inner tube to expand said inner tube in said outer tube for fixing a position thereof responsive to rotation of said eccentric rotation device;
a seat tube having a distal end pivotally connected to said front tube set, said seat tube being provided with a saddle at a top end of said seat tube;
a rear tube having a top end pivotally connected to said seat tube;
a fastening device being provided between said rear tube and said seat tube, said fastening device fixing said seat tube when said rear tube pivotally rotates with respect to said seat tube to unfold; and
a joint link connected between said front tube set, said seat tube and said rear tube for displaceably interconnecting said front tube set, said seat tube and said rear tube to unfold and fold with respect to one another.

2. The improved folding bicycle structure as claimed in claim 1 further comprising a rear rack, which is pivotally provided at a tail portion of said rear tube, said rear rack being pivotally turned to become horizontal for carrying articles thereon, said rear rack being pivotally turned to become vertical for folding and letting said bicycle be erect on the ground.

3. The improved folding bicycle structure as claimed in claim 1, wherein said eccentric rotation device is further firmly connected with said first handle, said eccentric rotation device being released from engagement with said action rod to release said first handle to rotate to said second side of said action rod adjacent said second handle, said eccentric rotation device being engaged with said action rod to secure said first handle at said first side of said action rod opposite of said second handle.

4. The improved folding bicycle structure as claimed in claim 1, wherein said seat tube is a retractable seat tube.

5. The improved folding bicycle structure as claimed in claim 1, wherein a fixing member is displaceably coupled to said joint link to releaseably fix said joint link when said front tube, said seat tube and said rear tube are in an unfolded position.

6. An improved folding bicycle structure comprising:
a retractable front tube set including an outer tube having an inner tube therein, an action rod having a top and a bottom being provided in said inner tube;
a first handle being provided on a first side of said top of said action rod, and a second handle being provided at a second opposing side of said top of said action rod;
an eccentric rotation device being pivotally coupled and releasably engagable with said top of said action rod, said action rod being releaseably engaged with said inner tube to expand said inner tube in said outer tube for fixing a position thereof responsive to rotation of said eccentric rotation device;
a seat tube having a distal end pivotally connected to said front tube set, said seat tube being provided with a saddle at a top end of said seat tube;
a rear tube having a top end pivotally connected to said seat tube;
a fastening device being provided between said rear tube and said seat tube, said fastening device fixing said seat tube when said rear tube pivotally rotates with respect to said seat tube to unfold, wherein said fastening device including:
a support arc piece connected with said rear tube;
a U-shaped piece connected with said support arc piece, two projective points being provided at inner sides of two clamping arms of said U-shaped piece; and
a U-shaped clamping body whose opening opposes an opening of said U-shaped piece and is pivotally connected therewith, two clamping arms of said U-shaped clamping body being inside said two clamping arms of said U-shaped piece, said U-shaped clamping body being clamped outside said seat tube, said rear tube being used to drive said U-shaped piece to pivotally turn and let said support arc piece support said seat tube and said two projective points compress said U-shaped clamping body so as to drive said two clamping arms of said U-shaped clamping body to contract inwards and clamp said seat tube when said rear tube pivotally turns with respect to said seat tube, thereby fixing said seat tube; and
a joint link connected between said front tube set, said seat tube and said rear tube for displaceably interconnecting said front tube set, said seat tube and said rear tube to unfold and fold with respect to one another.

7. The improved folding bicycle structure as claimed in claim 6, wherein a shock absorber is further provided between said support arc piece and said rear tube.

* * * * *